(12) United States Patent
Briancourt

(10) Patent No.: US 6,811,116 B1
(45) Date of Patent: Nov. 2, 2004

(54) AIRCRAFT LANDING GEAR

(75) Inventor: Stephen P. Briancourt, Bristol (GB)

(73) Assignee: Airbus UK Limited, Bristol (GB)

( * ) Notice: Subject to any disclaimer, the term of this patent is extended or adjusted under 35 U.S.C. 154(b) by 223 days.

(21) Appl. No.: 09/674,681

(22) PCT Filed: Sep. 8, 2000

(86) PCT No.: PCT/GB00/03453
§ 371 (c)(1),
(2), (4) Date: Nov. 3, 2000

(87) PCT Pub. No.: WO01/19672
PCT Pub. Date: Mar. 22, 2001

(30) Foreign Application Priority Data

Sep. 10, 1999 (GB) .............................................. 9921379

(51) Int. Cl.[7] .............................................. B64L 24/10
(52) U.S. Cl. .............................. 244/102 R; 244/100 R
(58) Field of Search ........................ 244/100 R, 102 R, 244/102 A, 103 R, 102 SL

(56) References Cited

U.S. PATENT DOCUMENTS

| 2,801,817 | A | * | 8/1957 | Brader | 244/102 |
|---|---|---|---|---|---|
| 2,982,500 | A | * | 5/1961 | Lucien | 244/102 |
| 3,638,887 | A | * | 2/1972 | Thurston | 244/102 SL |
| 4,720,063 | A | * | 1/1988 | James et al. | 244/102 R |
| 5,029,775 | A | * | 7/1991 | Abramovitsh | 244/102 R |
| 5,100,083 | A | | 3/1992 | Large et al. | 244/102 SS |
| 5,299,761 | A | * | 4/1994 | Robin et al. | 244/102 SS |

FOREIGN PATENT DOCUMENTS

| FR | 2393 726 | 1/1979 |
|---|---|---|
| GB | 651 149 | 5/1948 |
| GB | 674 237 | 6/1952 |
| GB | 1 169 643 | 11/1969 |
| GB | 1 181 254 | 2/1970 |
| GB | 1 239 919 | 7/1971 |
| GB | 2 094 242 | 9/1982 |

* cited by examiner

Primary Examiner—Jack Keith
Assistant Examiner—Gabriel Sukman
(74) Attorney, Agent, or Firm—Nixon & Vanderhye P.C.

(57) ABSTRACT

An aircraft, aircraft fuselage, aircraft wing and aircraft landing gear are provided. The landing gear (10) comprises a wheeled leg (12) and a series of mounting members (14, 15, 16, 17) to attach the leg to an airframe of the aircraft via respective attachments (14a, 15a, 18, 19). The leg is pivotably movable between a first stowed position within the aircraft and a second deployed position for movement of the aircraft along the ground, and at least one of the attachments (18) is configured to allow retraction movement of the leg to occur about an angularly variable pivot axis and thus avoid obstacles that would be encountered in a conventional retraction path, and also to alleviate forces in the gear that can be caused by four point location of the gear leg.

20 Claims, 3 Drawing Sheets

RETRACTION MOVEMENT

AIRCRAFT LANDING GEAR

FIELD OF THE INVENTION

This invention relates to aircraft landing gear.

DISCUSSION OF THE PRIOR ART

With modern passenger-carrying aircraft becoming ever larger and more complex the retraction and stowage of landing gear, especially wing and body main landing gear, is becoming ever more difficult. Sometimes retraction action of the gear can be restricted by the proximity of other gears or equipment or by a restricted entry into the stowage bay and the avoidance of such problems can create considerable difficulties for the designer, potentially resulting in completely redesigning the landing gear configuration for the aircraft, or if not then often the addition of substantial extra weight by the use of a non optimum design to avoid the retraction problem.

SUMMARY OF THE INVENTION

An object of the present invention is to provide a landing gear in which such problems will be removed or at least alleviated.

According to a first aspect of the invention there is provided an aircraft landing gear comprising a wheeled leg and a plurality of leg mounting members to be attached to an airframe of the aircraft via respective attachments, the leg being pivotably movable between a first stowed position within the aircraft and a second deployed position for movement of the aircraft along the ground, at least one of the attachments being configured to allow retraction movement of the leg to occur about an angularly variable pivot axis.

In this way, whilst pivotal retraction (or deployment) movement takes place, parts of the gear liable to contact other parts of the aircraft may be caused to move clear of the obstacle by varying the pivot axis during the pivotal movement.

It is envisaged that the angular variation of the pivot axis may be achieved in any convenient way, for example by providing the at least one attachment with at least one cam track to guide the said pivotal movement, or by forming the at least one attachment with a pair of links, or by forming the at least one attachment by a series of variable length links such as sprung links or hydraulic actuators. It is envisaged that any number of ways could be used to achieve the pivotal movement of the gear about a variable pivot axis and this invention is intended to cover any such way.

In the attachment with the pair of links, the links are preferably arranged to allow a small amount of free movement in a given direction when the gear is in the deployed position but to restrict movement in other directions and preferably to allow only controlled pivotal retraction movement of the gear. In this way, if the gear employs four point location in the deployed position, using two side stays in conjunction with fore and aft pintle mountings for example, then a slight amount of free up and down movement in the deployed position may be allowed by the links. This may be achieved by arranging at least one of the links, and possibly both links, substantially horizontally in the deployed position. This freedom to move afforded by the invention, in the deployed position, will then alleviate unwanted stresses caused by the statically indeterminate structure created by the four point location when gear deflection occurs during taxing or takeoff or landing, or with wing deflection in flight before the gear is retracted.

The controlled pivotal retraction movement may be achieved by arranging for the links to be substantially in plane, in the deployed position, and substantially out of plane as soon as retraction movement commences. This may therefore be achieved by having spaced pivot axes for the links and preferably by having links of unequal length. Most preferably in one embodiment, links of unequal length having spaced pivot axes are arranged for a forward pintle mounting for the gear with the links being substantially in plane and horizontal in the gear deployed position. Thus, with two side stays and a rear pintle mounting in conjunction with the forward pintle mounting, a small amount of up and down movement of the forward pintle mounting part of the gear will be allowed when deployed but torque induced in a main leg of the gear, for example during turning, will be reacted by the attachment of the invention.

In another embodiment the invention may include a resilient element interposed between a pivotal attachment to the aircraft structure of a said link and the leg, effectively to allow limited length changes in the said link upon deflections of the aircraft structure.

The resilient element may comprise a torque shaft connecting a crank on the leg, to which the said link is pivotably attached, to the leg.

The torque shaft conveniently extends within a passage defined in the leg.

According to a second aspect of the invention there is provided an aircraft wing having landing gear thereon according to the first aspect of the invention.

According to a third aspect of the invention there is provided an aircraft fuselage including landing gear according to the first aspect of the invention.

According to a fourth aspect of the invention there is provided an aircraft having a landing gear according to the first said aspect of the invention.

BRIEF DESCRIPTION OF THE DRAWINGS

An aircraft landing gear according to the invention will now be described by way of example with reference to the accompanying drawings in which.

DETAILED DISCUSSION OF EMBODIMENTS

Figure 1:
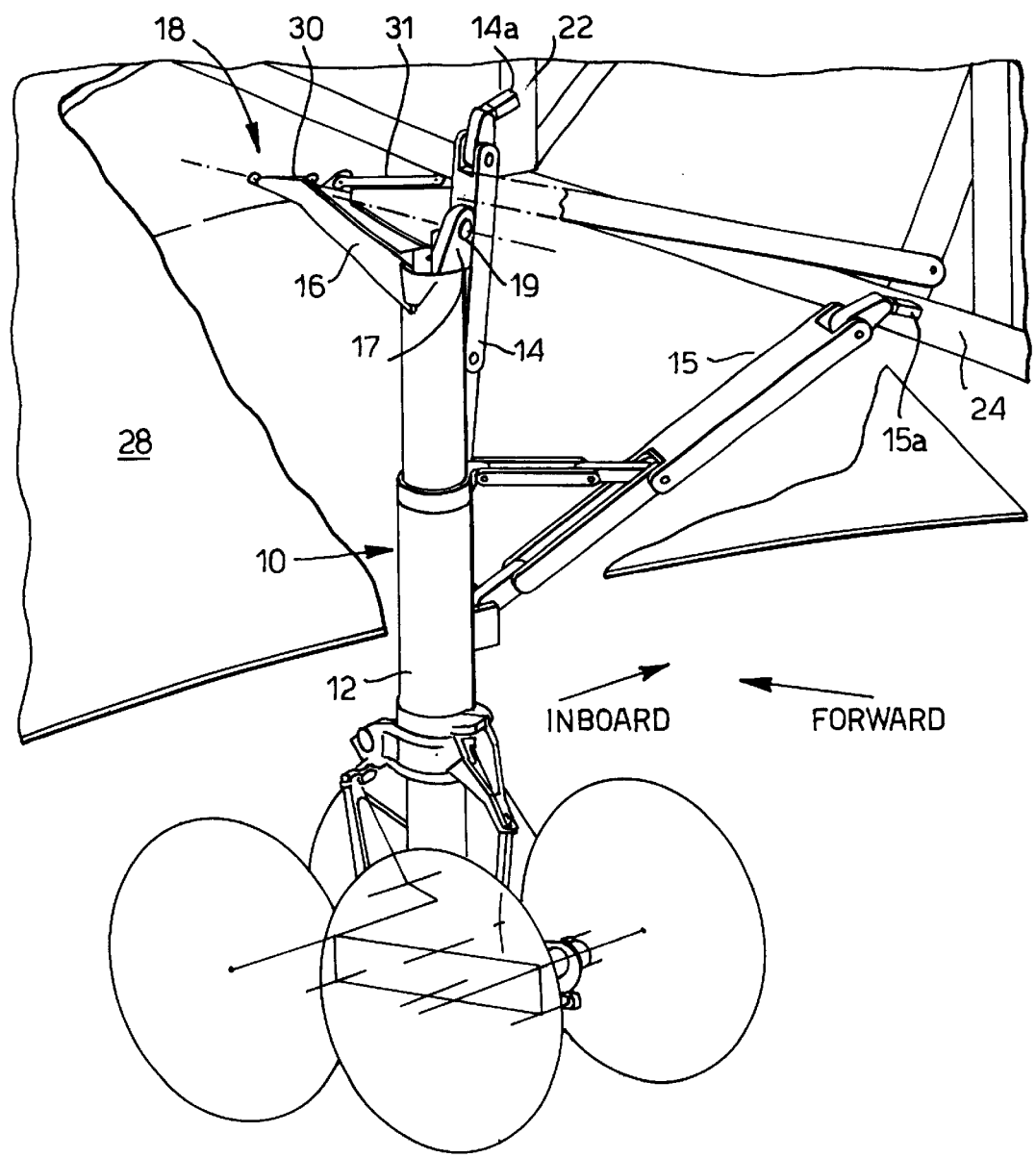
FIG. 1 is a diagrammatic perspective view of one form of landing gear in accordance with a first embodiment of the invention.

In FIG. 1 a landing gear is generally indicated at 10 and comprises a leg 12 connected to fore-and-aft side stays 14, 15 respectively. The leg 12 is also connected through arms 16, 17 to front and rear pintle mountings 18, 19. Instead of the pintle mountings 18, 19 defining a common fore-and-aft axis, known as the pintle axis, as in the prior art, a variable angle pivotal axis is formed on gear retraction which will be a function of the link mechanism of the forward mounting 18. The side stays 14, 15 and pintle mountings 18, 19 effectively form a four point attachment for the landing gear, the side stays being connected by attachments 14a, 15a to parts 22, 24 of a fuselage (not shown).

The pintle mounting 18 connects the arm 16 to a rear spar 29 of a wing 28 extending from the fuselage and the pintle mounting 19 is connected to the wing 28 by a further attachment (not shown for reasons of clarity).

The forward pintle mounting 18 comprises a pair of links 30, 31 both acting between the arm 16 and the rear spar 29. The links 30, 31 are of unequal length, with the link 31 being longer. Link 30 extends between pivotal connections 32 and 33 on the arm 16 and the rear spar, respectively, and link 31 extends between pivotal connections 34 and 35 on the arm 16 and the rear spar, respectively. Pivotal connection 34 is formed on a lug 36 carried on the arm of the gear.

It will be seen that with the gear in the deployed position of FIG. 1 that the links 30, 31 extend substantially horizontally and generally in plane with each other. Minor up and down movement of the arm 16 will therefore be permitted by the links in this position. Owing to the rigidity with which a landing gear leg such as leg 12 is constructed however, it may be desirable to make one of the links 30, 31 capable of slight length variation, such as by inserting a stiff spring therein (not shown). In this position the gear relies on the four point location for up and down stability, although the mounting 18 provides side to side location for the arm 16.

Figure 2:
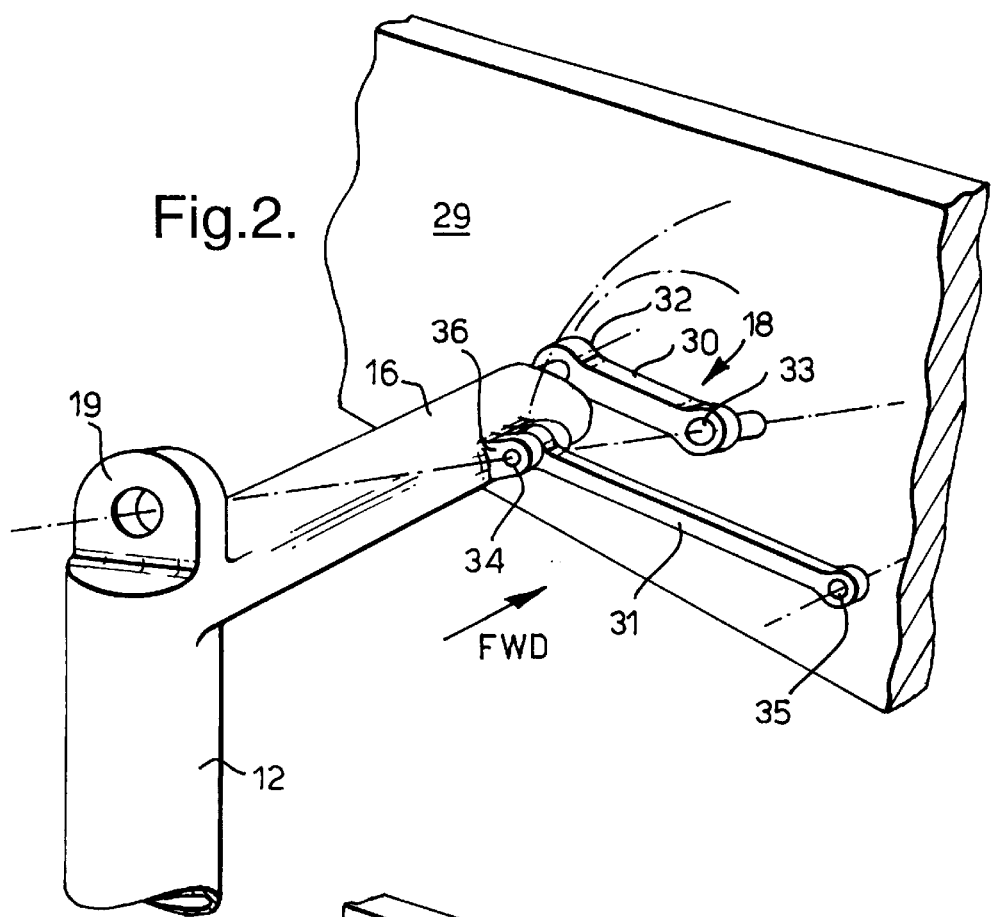
FIG. 2 is a perspective view, to a larger scale, of an attachment of landing gear similar to that shown in FIG. 1 in a deployed position.
Figure 3:
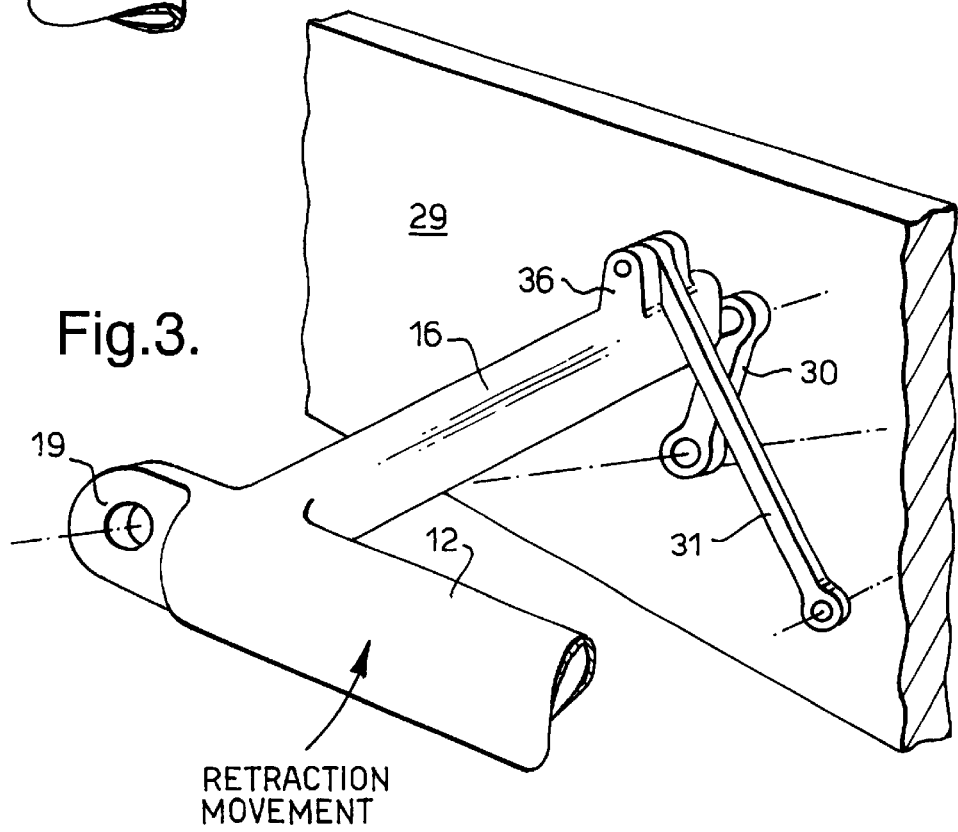
FIG. 3 shows the attachment of FIG. 2 in a stowed position.

As soon as the stays 14 and 15 were broken to allow retraction movement to start the gear would become unstable if the mounting 18 did not provide increased stability over that afforded in the deployed position, however as soon as the retraction actuator starts to pivot the leg 12 upwardly, as shown by the arrow marked "Retraction Movement" in FIG. 3, the links 30, 31 will move out of plane from each other and both vertical and horizontal stability for the leg 12 will be provided. The gear will continue to pivot, about an axis which varies according to the mechanism of mounting 18, as the gear is moved from the position of FIG. 2 towards that of FIG. 3. With this geometry, the leg 12 will move forward initially as it starts to pivot upwards, and any obstacles level with the leg in the fore and aft direction will thus be avoided as retraction takes place.

It will be seen from FIG. 3 that, in the stowed position, the links of the mounting 18 provide great up and down stability for the arm 16, by virtue of the almost vertical link 30, and considerable side to side stability by virtue of the partly horizontal link 31. The lack of stability provided by the stays 14 and 15, in the stowed position, is therefore compensated for by the design of the mounting 18 of the invention.

Figure 4:
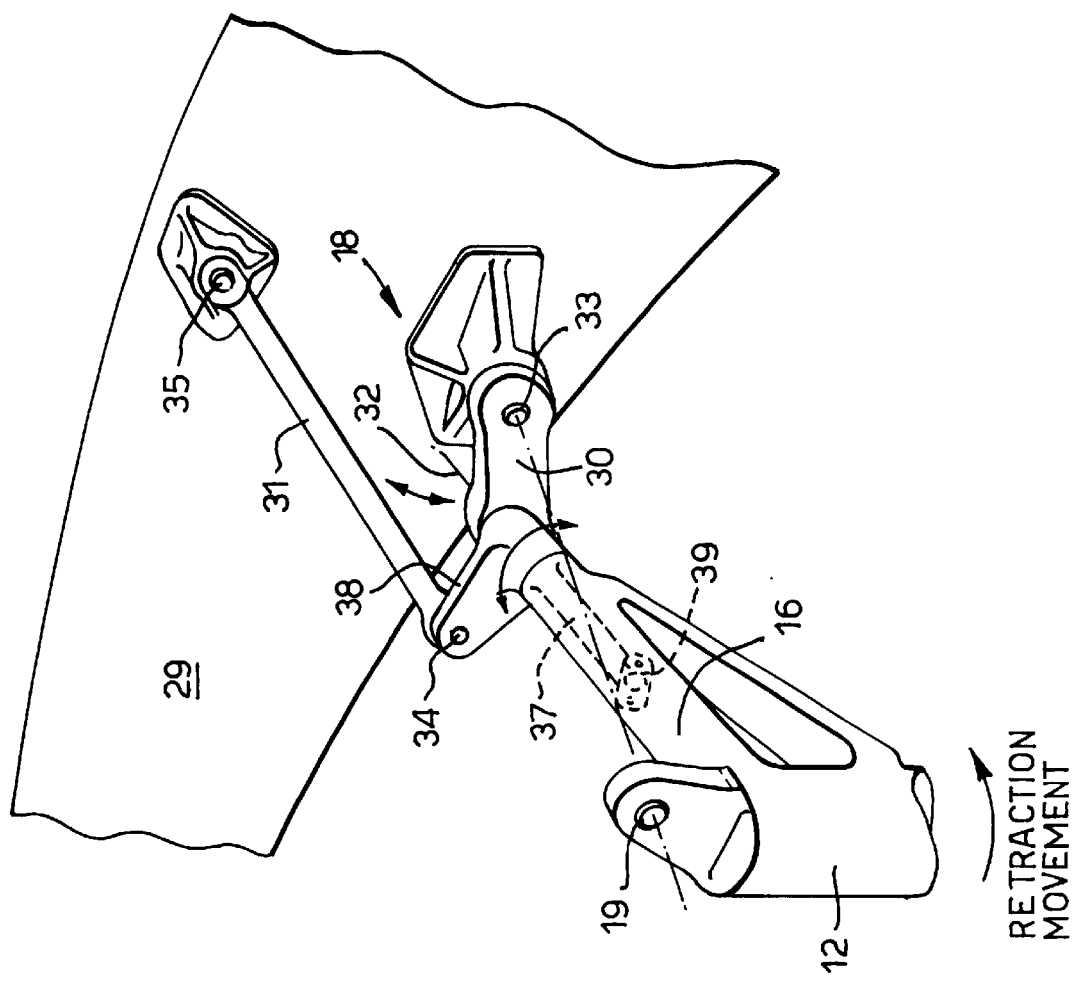
FIG. 4 is a perspective view of a second embodiment of the invention.

In FIG. 4 an alternative embodiment of the invention is shown using a different link arrangement from that shown in FIGS. 1 to 3 to provide an alternative landing gear retraction geometry. Nevertheless the gear is viewed from substantially the same direction as that shown in FIGS. 1 to 3 with retraction movement again taking place in an anti-clockwise direction from the position shown. The leg 12 is shown in its deployed position.

Corresponding parts have been given numbers corresponding to those used in FIGS. 1 to 3 for consistency.

Aside from the geometric differences between the embodiment of FIGS. 1 to 3 and that of FIG. 4, the embodiment of FIG. 4 also differs from the earlier embodiment by employing a torque shaft 37 to absorb gear deflections when stressed. The torque shaft 37 is anchored at one end to a stub mounting 38 rotatably attached to one end of the arm 16 and at the other end to the arm 16 at the end of a passage (not shown) defined centrally through the arm 16. A screwed anchorage 39 holds the torque shaft 37 fast in rotation with the arm 16. The stub mounting 38 is rotatably mounted to the end of the arm 16 on a bearing arrangement (not shown). The torque shaft 37 is sufficiently stiff to allow a few degrees of positive and negative rotation from the neutral position shown in the Figure. It will be appreciated that upwards or downwards wing deflection causing upwards or downwards movement of the rear spar 29 relative to the leg 12 will tend to cause corresponding upwards and downwards movement of the end of the arm 16 to which the links are attached. The link arrangement of course removes this tendency but will tend to impose a rotational force on the arm 16 which cannot take place owing to the rigid bracing by the side stays 14, 15 and pintle mounting 19. This turning moment on the arm 16 is created by the links 30, 31 acting thereon through the pivots 32, 34. This unwanted rotational movement of the arm 16 is removed in this embodiment by the action of the torque shaft 37 being rotated within the arm 16. This rotational movement is sprung movement owing to the resilience of the torque shaft whose stiffness can be tuned to provide the desired degree of rigidity for leg mounting in conjunction with the required flexibility to absorb deflection movements of the rear spar. The sprung movement of the torque shaft 37 corresponds to sprung movement of variable length links 30, 31 in the embodiment of FIGS. 1 to 3, depending upon which of the links 30, 31 is selected to vary in length to absorb deflection movement.

As shown in FIG. 4 the embodiment has the leg deployed. In this position the stub mounting 38 extends upwardly slightly from the arm 16 to the pivot 34. Similarly, the link 30 extends upwardly slightly from the pivot 32 to the pivot 33. Once retraction movement of the leg commences the pivot axis 32 will rise through a position when the pivot axes 34, 32 and 33 are co-linear to the stowed position of the leg when the pivot axis 32 will be somewhat above the axes 34 and 33, the leg will have rotated anti-clockwise through, for example, some 80 degrees and the link 30 will have rotated clockwise through a similar angular deflection. The long link 31, upon commencement of retraction movement, will initially nod upwardly slightly at its axis 34 and will subsequently rotate anti-clockwise to accommodate the movement to the right of the pivot axis 34 during counter-clockwise rotation of the arm 16 and stub mounting 38. It will be appreciated that the axis of the pintle mounting 19 remains fixed while the pivot axis 32 of the link end of the arm 16 will rotate about the axis 33. The effective retraction axis of the leg 12 will therefore angularly vary as the leg 12 is retracted by counter-clockwise rotation. The rotation path of the leg 12 may be tuned to some extent in order to provide a retraction path of the leg 12 and wheels mounted at a lower end thereof which avoids any obstacles otherwise in its path such as landing gear doors, further gears, components in the storage bay or other parts of the aircraft structure.

In the embodiment of FIG. 4 the torque shaft 37 enables an extremely neat, space efficient and lightweight sprung absorber of minor movements to be used to absorb unwanted rotational movement within the arm 16 of the leg while the larger vertical relative deflections between the arm 16 and rear spar 29 of the wing are absorbed by movement of the links 30, 31.

As mentioned above, a four point attachment is a statically indeterminate structure. Relative deflection between the wing 28 and the fuselage tends to induce substantial forces in the structure and the present invention accommodates such relative deflection and reduces such induced loading while at the same time allowing a variable pivotal retraction axis so that obstacles otherwise in the retraction path of the gear may be avoided by careful design of the link lengths and pivot locations.

More generally, with the landing gear 10 supporting the aircraft, the side stays 14, 15 act to brace the leg 12 against pivoting about the pintle mountings 18, 19. When the landing gear is to be retracted, each side stay 14, 15 articulates about a central pivot 40 in response to the unlocking and folding of a pair of lock links (not shown) acting between the leg 12 and its associated side stay. Operation of a retraction actuator (not shown) then raises the undercarriage leg 12 about the variable pintle axis to a stowed position in a wheel bay (not shown).

Should relative deflection occur between the wing 28 and the fuselage with the landing gear 10 in the FIG. 1 position, i.e. with the side stays locked, the resulting forces induced in the side stays 14, 15 and the arms 16, 17 will cause the arm 16 to displace the links upwards or downwards about their pivot axes. Such deflections can be induced whenever the side stays are locked as aforesaid, such as when the aircraft is sitting stationary on the ground, when wing bending occurs in flight before gear retraction, or when the aircraft touches down upon landing. In the latter circumstances in particular both drag loads on the gear and "springback" loads occurring immediately after touchdown can cause the links to deflect both downwardly and upwardly respectively. In that way, the landing gear 10 of the invention is much more able to accommodate loading resulting from the aforesaid relative deflection and reduce the load which would otherwise be induced in the side stays 14, 15 and arms 16, 17.

The invention provides particular advantage over known double sidestay landing gear designs for lockout of the sidestays at completion of gear deployment. This advantage is manifested both during in-flight deployment and during deployment of the gear when the aircraft is supported on jacks. During the last stages of in-flight deployment substantial air loads occur on the gear to deflect it rearwardly. These forces tend to pull the forward sidestay 14 into its final bracing position, as shown in FIG. 1, but the rear sidestay 15 is prevented from fully extending by the fact that the gear is deflected to a position where there is insufficient length to allow the rear sidestay 15 to straighten to its final bracing position. Thus very considerable force must be applied to sidestay 15 finally to straighten it. This is clearly undesireable and, if reliable deployment of the rear sidestay is to be ensured, larger than normal actuating forces to deploy the rear sidestay must be provided. This will clearly add weight to the aircraft and may additionally affect reliability. The above problem is endemic in double sidestay designs and cannot be avoided with standard four point location of the gear leg.

With the geometry of the present invention however, and particularly with the link arrangement described, final deployment movement of the wheels and leg of the gear can be rearward, as the links rotate downwardly into final position and the leg rotates rearwardly about the rear pintle 19. This rearward movement of the leg allows the rear sidestay to lengthen and lock into position without any additional effort being applied thereto.

A similar problem occurs with known double sidestay arrangements when it is attempted to deploy the gear with the aircraft on jacks. The high point loading upwardly on the wing at the jack position slightly outboard of the gear causes the wing to deflect upwardly. This again, with a conventional four point location gear, tends to draw the leg rearward as the wing will also rotate forwardly under the jack load. Thus known designs may need assistance to lock out both sidestays when on the jacks. The gear of the present invention will simply drop into the locked position however, without the application of any assisting forces.

What is claimed is:

1. An aircraft landing gear for an aircraft, said landing gear comprising:
   a wheeled leg; and
   a plurality of leg mounting members attached to an airframe of the aircraft via respective attachments, the leg being pivotably movable between a first stowed position within the aircraft and a second deployed position for movement of the aircraft along the ground, and at least one of the attachments being configured to allow retraction movement of the leg to occur about an angularly variable pivot axis.

2. An aircraft landing gear as in claim 1 in which the at least one of the attachments is formed by a pair of links.

3. An aircraft landing gear as in claim 2 in which the links are arranged to allow free movement in a given direction when the leg is in the deployed position but to restrict movement in other directions and to allow only controlled pivotal retraction movement of the leg.

4. An aircraft landing gear as in claim 3 in which the free movement is in an up and down direction and in which at least one link is arranged generally horizontally with the leg in the deployed position.

5. An aircraft landing gear as in claim 4 in which both links extend generally horizontally with the leg in the deployed position.

6. An aircraft landing gear as in claim 2, when dependent on claim 2, in which the retraction movement about a variable pivot axis is achieved by arranging the links to be substantially in plane, in the deployed position, and substantially out of plane as soon as retraction movement commenced.

7. An aircraft landing gear as in claim 2 including a resilient element interposed between a pivotal attachment to the aircraft structure of a said link and the leg, effectively to allow limited length changes in the said link upon deflections of the aircraft structure.

8. An aircraft landing gear as in claim 7 in which the resilient element comprises a torque shaft connecting a crank on the leg, to which the said link is pivotably attached, and the leg.

9. An aircraft landing gear as in claim 8 in which the torque shaft extends within a passage defined in the leg.

10. An aircraft landing gear as in claim 2, when dependent on claim 2, in which the links have spaced pivot axes and are of unequal length.

11. An aircraft wing including a landing gear according to claim 1.

12. An aircraft fuselage including a landing gear according to claim 1.

13. An aircraft including a landing gear according to claim 1.

14. An aircraft landing gear for an aircraft, said landing gear comprising:
   a wheeled leg;
   a shock absorber; and
   a plurality of leg mounted members, said leg mounted members to be attached to an airframe of the aircraft via respective attachments, the leg being pivotably movable between a first stowed position within the aircraft and a second deployed position for movement of the aircraft along the ground, and at least one of the attachments being configured to allow retraction movement of the leg to occur about an angularly variable pivot axis.

15. An aircraft landing gear for an aircraft, said landing gear comprising:

a wheeled leg;

a plurality of leg mounting members to be attached to an airframe of the aircraft via respective attachments, the leg being pivotably movable between a first stowed position within the aircraft and a second deployed position for movement of the aircraft along the ground, and at least one of the attachments is formed by a pair of links and is configured to allow retraction movement of the leg to occur about an angularly variable pivot axis; and a resilient element interposed between a pivotal attachment to the aircraft structure of said links and the leg, effectively to allow limited length changes in the said link upon deflections of the aircraft structure, wherein the resilient element comprises a torque shaft connecting a crank on the leg, to which the link is pivotably attached, and the leg.

16. An aircraft landing gear as in claim 15, in which the torque shaft extends within a passage defined in the leg.

17. An aircraft landing gear as in claim 14 in which the at least one of the attachments is formed by a pair of links.

18. An aircraft landing gear as in claim 17 in which the links are arranged to allow free movement in a given direction when the leg is in the deployed position but to restrict movement in other directions and to allow only controlled pivotal retraction movement of the leg.

19. An aircraft landing gear as in claim 18 in which the free movement is in an up and down direction and in which at least one link is arranged generally horizontally with the leg in the deployed position.

20. An aircraft landing gear as in claim 19 in which both links extend generally horizontally with the leg in the deployed position.

\* \* \* \* \*